Patented Oct. 5, 1926.

1,602,306

UNITED STATES PATENT OFFICE.

HERBERT LANGWELL, OF EPSOM, ENGLAND.

FERMENTATION OF CELLULOSIC MATERIALS.

No Drawing. Application filed September 12, 1925, Serial No. 56,060, and in Great Britain September 10, 1924.

This invention relates to improvements in the process of the fermentation of cellulose or cellulosic material and may be regarded as an improvement on the process described in British specification No. 134,265.

In the fermentation of cellulosic materials published accounts have hitherto recommended the use of calcium or magnesium carbonate for the purpose of neutralizing the acids produced during the fermentation.

I have made investigations and have found that the best range of acidity for rapid fermentation is $P_{H_5}$ to $P_{H_9}$.

The use of calcium or magnesium carbonate cannot be relied on to ensure an acidity within this range but such substances can be employed according to the present invention provided they are used under certain conditions.

It has also been stated that the mash should be inoculated with some fermenting vegetable matter, such as horse manure, septic tank sludge or a portion of a previous fermentation.

I have also found that such inoculation is not always necessary.

The object of the present invention is to provide improved processes for the fermentation of cellulose or cellulosic material, these improvements lying, for example, in the directions of control, efficiency, yield of desired products or otherwise.

The invention in brief consists in a process for the fermentation of cellulosic materials according to which the hydrogen ion concentration is maintained within the limits about $10^{-9}$ and $10^{-5}$ measured in the bulk of the mash by the employment (a) of compounds of elements of which the phosphate is substantially soluble in water, namely compounds of alkali metals including ammonium, or (b) of compounds of elements of which the phosphate is substantially insoluble in water, namely compounds of alkaline earth metals including magnesium, in which case an alkaline earth metal compound is precipitated at appropriate times by the addition of a suitable compound which causes the formation of an insoluble alkaline earth metal compound.

The invention more specifically consists in a process for the fermentation of cellulosic materials according to which the hydrogen ion concentration is maintained within the limits of about $10^{-9}$ and $10^{-5}$ measured in the bulk of the mash by the employment (a) of oxides, hydroxides, carbonates or bicarbonates of alkali metals including ammonium or (b) oxides, hydroxides, carbonates or bicarbonates of alkaline earth metals including magnesium, in which cases compounds of alkali metals which cause the formation of insoluble alkaline earth metal compounds are added from time to time.

The invention also consists in a process as indicated in the preceding paragraph in which the cellulosic materials fermented are wholly or partly in the form of naturally occurring substances containing suitable natural bacterial flora capable of bringing about fermentation at high temperatures, for example about 60 to 70° C.

The invention also consists in a form of process according to either of the preceding two paragraphs in which stirring or agitation of the mash is employed.

The following examples illustrate how the invention may be carried into effect:—

*Example 1.*—Rice straw is preferably soaked in dilute acid of about 1 per cent concentration and heated to about 100° C. for about 2 or 3 hours until thoroughly softened and then pulped in any suitable manner. The acid in the pulp is then reduced to a hydrogen ion concentration of about $10^{-7}$, for example by whitening, and the whole charged into a fermenting vessel with water, suitable mineral nutrient matter such as potassium salts, e. g. potassium chloride, nitrogen-containing bodies such as ammonium chloride or sulphate, and bodies containing phosphorus such as sodium phosphate. The mass is then inoculated with from 1 per cent to 5 per cent of horse manure which has become heated by auto-fermentation. The whole is then heated to about 65°

C. As soon as active fermentation has set in, which may be in from 15 to 36 hours, the liquid is tested for hydrogen ion concentration and if it is found to be above $10^{-6}$ then sodium bicarbonate should be added in such amount as will bring the hydrogen ion concentration of the culture down to $10^{-7}$ or $10^{-8}$. The examination of the liquid and subsequent addition of the bicarbonate of soda is repeated until active fermentation has ceased. The resulting fermented liquor can then be worked up for the separation of the products contained therein by any of the ordinary wellknown methods. This fermentation is preferably carried out in a closed vessel in order that an atmosphere containing a considerable proportion of $CO_2$ may be retained.

*Example 2.*—This is a modification of Example 1 illustrating the employment of an alkaline earth metal carbonate in connection with the maintenance of the mash within the desired limits of hydrogen ion concentration.

According to this example a quantity of calcium carbonate more than necessary to neutralize the acids formed is added to the mash before fermentation commences.

After fermentation has taken place for some time it is found that owing to the soluble calcium salts which are produced by the neutralization of the acid bodies resulting from the fermentation the fermentation tends to become slower. Before this point is arrived at the soluble calcium salts which are the inhibiting bodies must be precipitated, preferably by the addition of suitable quantities of sodium or other alkali metal salts giving rise to the formation of insoluble calcium compounds. I preferably make use of sodium sulphate or sodium carbonate for this purpose. From time to time similar additions of alkali metal salts are made in order to keep the hydrogen ion concentration between the required limits and to keep the amount of calcium salts in solution sufficiently low to permit the fermentation to proceed actively. The concentration of calcium salts which brings about inhibition varies with the materials and conditions of working, but I have found in one example that inhibition, or detrimental slowing down, started when the soluble calcium salts reached 4 grammes, calculated as CaO per litre.

*Example 3.*—This is an example of a case in which unsterilized cellulosic material is employed as the product to be fermented.

Maize cobs which are dry but not sterile are first ground in an impact or other mill to a fine powder. 12 kgs. of this powder are charged into a closed vessel of about 220 litres capacity capable of being maintained at a temperature of about 60° C. and fitted with a device for gentle stirring. About 180 litres of water are then added together with 1 kg. crystalline dibasic soda phosphate, 440 gms. potassium chloride and 200 gms. ammonium chloride and 5 kgs. whitening (finely divided $CaCO_3$). The whole is then well mixed, brought up to 60° C. and sufficient sodium bicarbonate added (generally about 180 gms.) to bring the acidity down to about $P_H = 7.5$. The stirring gear is then stopped and the temperature of the mash maintained at about 60° C. After 20 hours about 10 cubic feet of gas will have been evolved. The stirring gear is then started and allowed to run until the fermentation is finished. 500 gms. of sodium bicarbonate are added from time to time as the soluble calcium salts increase. In practice it is found that the above addition may conveniently be made for about each 12 cubic feet of gas evolved. After seven to fourteen days (depending on the fineness of the cobs charged) the fermentation will be substantially complete and the mash is run off for recovery of the products.

The products in one case were:—

Acetic acid, 1.5 kgs. recovered as acetate.

Butyric acid, 0.3 kgs. recovered as butyrate.

Alcohol, 0.77 kgs.

75 cub. ft. gas containing $CO_2$, 73.5% by volume; $H_2$, 26.4% by volume; $CH_4$, 0.1% by volume.

*Example 4*—This deals with a modification of Example 3 applied to green vegetation not undergoing active fermentation containing suitable natural bacterial flora capable of bringing about fermentation at high temperatures, for example about 60 to 70° C.

The process is carried out in a similar vessel and under similar conditions to those previously described for corn cobs and differs only as regards the material charged. The green vegetation in one case consisted of the usual mixture of weeds growing about the hedge bottoms in Surrey (England) in August. These weeds were cut and passed through an ordinary chaff cutter. An amount of this material containing about 11 kgs. of dry material was charged into the vessel with 150 litres of water, 5 kgs. whitening and about 180 gms. sodium bicarbonate and heated to about 60° C. similarly to the previously described process, further quantities of sodium bicarbonate being added as required and previously described.

Fermentation by a process such as this where no nutrient materials are added but reliance is placed on such nutrients as are available in the green vegetation commonly is a much slower process than that in which an abundance of nutrient is supplied but it is convenient in some cases.

According to this particular example owing to the large size of the pieces used in this charge the fermentation required about 12 days for completion and yielded a small amount of acetic acid and 80 cubic feet of gas very rich in methane.

In this example hand stirring was substituted for mechanical stirring, the whole mass being roughly mixed by hand once a day.

*Example 5.*—This is a modification of Example 3 applied to the treatment of sterile cellulosic material, for example dry sulphite pulp.

The same proportions of substances mentioned in Example 3 are used in this example but in place of the 12 kgs. of dry maize cobs sulphite pulp containing about 8 kgs. of fermentable matter is used and the mash is suitably inoculated, for instance as in Example 1.

*Example 6.*—This is a further example of the fermentation of dry ground but not sterilized maize cobs using calcium salts and avoiding stirring during fermentation. The composition of the mash is as follows:—

| | Pounds. |
|---|---|
| Weight of cobs (calculated as air dry) | 28 |
| Whitening | 10 |
| Crystalline sodium phosphate | 2.2 |
| Commercially pure potassium chloride | 1.0 |
| Commercially pure ammonium chloride | 0.5 |
| Sodium bicarbonate | 0.5 |

Water to bring the total volume to 180 litres.

This mash contains about 7 per cent by weight of cellulosic matter. The above mixture is stirred, heated to about 60° C. in a fermentation vessel which is preferably aluminium lined and jacketed and maintained at that temperature without further agitation, the vessel being closed. The hydrogen ion concentration is maintained within the desired limits by adding sodium bicarbonate once a day in quantities representing about 1 lb. of bicarbonate of soda for every 10 cubic feet of gas evolved, measured at normal temperature and pressure. The total weight of bicarbonate usually required for a charge of the above amount is approximately 5 lb. After a fermentation of 8 days a mixture representing the following is obtained:—

| | Gms. per litre. |
|---|---|
| Acetic acid | 11.7 |
| Butyric acid | 0.3 |
| Alcohol | 2.2 |
| Gases | about 70 cubic feet. |

The gases referred to comprise about 80 per cent of carbon dioxide and the remaining 20 per cent is a mixture of methane and hydrogen. The cellulose equivalent of the fermented mash is about 15 gms. per litre, the original dry cob concentration being about 60 gms. per litre, the cellulose equivalent being the calculated amount of cellulose destroyed or converted into the products mentioned above neglecting the gaseous substances.

*Example 7.*—This is an example similar to Example 6 in which stirring is employed.

Stirring tends to prevent the formation of methane, increases the yield of alcohol but decreases the yield of acetic acid. With stirring the same mixture as that of Example 6 after 7 days' fermentation yields the following:—

| | Gms. per litre. |
|---|---|
| Acetic acid | 8.4 |
| Butyric acid | 1.3 |
| Alcohol | 2.7 |
| Methane | Undetermined. |

Butyric acid figures in this and in other examples may have a comparatively large margin of error owing to difficulty of exact ready estimation. The cellulose equivalent of the fermented products in this example is 14.7 gms. per litre, the original dry concentration being 53 gms. per litre.

*Example 8.*—This is an example of a case in which the formation of insoluble products by reaction of salts produced during fermentation with the added nutrient is avoided and may be regarded as a modification of Example 1.

According to this example the process is carried out in a manner similar to any of the processes of Examples 3 to 7 with the omission of the whitening.

*Example 9.*—This is an example employing phosphatic nutrient prepared from rock phosphate.

According to this example the phosphate employed is equivalent to 125 gms. of crystalline soda phosphate and is prepared from 75 gms. of rock phosphate. 250 gms. of potash are employed. The yield depends on the kind of corn cob employed but two results are as follows:—

| | Gms. per litre. |
|---|---|
| (*a*) Acetic acid | 20.8 |
| Butyric acid | 2.12 |
| Alcohol | 0.43 |
| Cellulose equivalent | 23.4 |

| | Gms. per litre. |
|---|---|
| (*b*) Acetic acid | 15.3 |
| Butyric acid | 0.09 |
| Alcohol | 3.44 |
| Cellulose equivalent | 19.9 |

The corn cobs to which reference has been made were prepared by grinding dry maize cobs in a suitable mill to pass through a sieve having 30 meshes per linear inch, 75 per cent. of the product passing through a 50-mesh sieve.

The mash is made up by the addition of water, nutrients and neutralizing agents and the hydrogen ion concentration is kept within the desired limits, for instance by the method of Example 8.

*Example 10.*—This is an example similar to Example 9 except that the corn cobs were prepared by pulping.

According to this example dry maize cobs are turned into a stream digester where they are subjected to the action of steam under a pressure of about 40 lb. per square inch for 3 hours. Steam is then blown off into another digester. The treated mass is washed with water until free from furfural and then pulped. The pulped mass is suitably inoculated, for example with a 1 per cent previous culture, that is to say 1800 ccs. of mash from a previous culture are added to 180 litres of mash, and is made up by adding water, nutrients and neutralizing agents as required. The mash is kept within the desired limits of hydrogen ion concentration, for instance, by the method of Example 8. A typical result from this kind of process is as follows:—

| | Gms. per litre. |
|---|---|
| Acetic acid | 19.80 |
| Butyric acid | 1.56 |
| Alcohol | 0.23 |
| Cellulose equivalent | 21.1 |

*Example 11.*—This is an example which deals with a case in which the cellulose may not be properly fermented by reason of the action of gases generated during fermentation.

Owing to the insolubility of the cellulose and the great volume of gas evolved during fermentation, the cellulose may rise to the surface or even completely out of the culture liquid, so that very little nutrient material will be in contact with the cellulose in spite of the fact that sufficient may have been added to the culture in the first place. In order therefore that the organisms may receive their full share of nutrient the mash should be agitated in a gentle manner so as to disengage the gas bubbles therefrom and the cellulose should be kept submerged so that the maximum amount of controlled nutrient is always available for the fermentation. Instead of gently agitating or stirring the solid product to be fermented it may be kept floating on the surface, so that it is in contact with a relatively small amount of nutrient according to the degree of immersion of the cellulose and to compensate for the thus decreased amount of available nutrient an increased amount may be used in the mash.

The hydrogen ion concentration is maintained within the limits $10^{-9}$ and $10^{-5}$ for example by the method described in Example 1.

*Example 12.*—This example shows the effect of aeration.

The charges used were the same as those of Example 10 but the vessel was left open during the day and compressed air blown through the mash with vigorous stirring. The air was admitted for 6 hours a day for 5 days. The gases during this period escaped into the air and owing to the temperature it is probable that much alcohol was lost by evaporation. The following represent typical results:—

| | Gms. per litre. |
|---|---|
| (a) Acetic acid | 15.0 |
| Butyric acid | 1.80 |
| Alcohol | 1.01 |
| Cellulose equivalent | 18.6 |

| | Gms. per litre. |
|---|---|
| (b) Acetic acid | 16.7 |
| Butyric acid | 0.61 |
| Alcohol | 3.75 |
| Cellulose equivalent | 22.7 |

*Example 13.*—This is an example illustrating the use of sodium carbonate instead of sodium bicarbonate for maintaining the mash within the desired limits of hydrogen ion concentration. The composition of the mash is similar to that given in Example 8 but in place of the daily additions of sodium bicarbonate a chemically equivalent amount of sodium carbonate is used for each day. Typical results are as follows:

| | Gms. per litre. |
|---|---|
| (a) Acetic acid | 10.01 |
| Butyric acid | 2.52 |
| Alcohol | 4.58 |
| Cellulose equivalent | 21.8 |

| | Gms. per litre. |
|---|---|
| (b) Acetic acid | 18.0 |
| Butyric acid | 0.84 |
| Alcohol | 4.05 |
| Cellulose equivalent | 24.9 |

*Example 14.*—According to this example fermentation is carried out under reduced pressure.

By way of example the vacuum employed was half an atmosphere, the other factors being similar to those of Example 8.

*Example 15.*—This is an example of a fermentation under comparatively anaerobic conditions.

The conditions were the same as those of Example 8, but the vessel after being charged was kept closed so that there was little access of air or oxygen other than that originally in the vessel. The products were as follows:—

| | Gms. per litre. |
|---|---|
| Acetic acid | 17.8 |
| Butyric acid | 0.95 |
| Alcohol | 2.30 |
| Cellulose equivalent | 21.8 |

*Example 16.*—This is an example according to which the desired hydrogen ion concentration is maintained by the use of ammonium carbonate. The composition of the mash is similar to that given in Example 8 but the hydrogen ion concentration is maintained within the desired limits by daily additions of ammonium carbonate equivalent to the additions of sodium bicarbonate given in that example.

The following are typical results:—

(a)
| | Gms. per litre. |
|---|---|
| Acetic acid | 18.7 |
| Butyric acid | 0.15 |
| Alcohol | 0.86 |
| Cellulose equivalent | 18.6 |

(b)
| | Gms. per litre. |
|---|---|
| Acetic acid | 13.7 |
| Butyric acid | 0.16 |
| Alcohol | 4.80 |
| Cellulose equivalent | 21.1 |

The end products of fermentation may be varied according to the nutrient employed. Generally speaking when methane is found in the gases evolved from the direct fermentation of cellulose no alcohol is being produced at that period, but when the gases contain only hydrogen and carbon dioxide alcohol is usually produced. As an illustration of this the following may be cited:— The gas produced contained 54.2 per cent carbon dioxide and 45.8 per cent hydrogen. The products of fermentation were acetic acid in an amount equivalent to 28.7 per cent of the cellulose fermented and alcohol in an amount equivalent to 21.3 per cent of the cellulose fermented. The following experiment shows how the gases produced and thereby the kind and quantity of the products produced vary with variations in the quantity of available nutrient material in the mash; the fermentation was carried out in all examples at a temperature of about 65° C.

*Examples.*

| | Gms. potassium chloride | Gms. sodium phosphate | Gms. ammonium chloride | Typical gases evolved: | | |
|---|---|---|---|---|---|---|
| | | | | $CO_2$ | $H_2$ | $CH_4$ |
| I | 0.09 | 0.20 | 0.10 | 56.3 | 43.7 | |
| II | .04 | .20 | .10 | 62.0 | 9.9 | 28.1 |
| III | .09 | .05 | .10 | 57.2 | 30.4 | 12.4 |

In a mash containing the amounts of nutrient materials given in Example I no methane is produced but there is a considerable alcohol yield.

In Example II in which the amount of potassium salt is reduced to about half and a considerable amount of methane is formed, at the expense of hydrogen, analysis showed that alcohol was not produced as the final product. In Example III the quantities of the potassium and ammonium salts are maintained as in Example I but the quantity of phosphate is reduced in comparison with that example. A considerable amount of methane is again formed and a corresponding reduction in the alcohol produced was shown in the analysis.

In each case fermentation was quite vigorous and actual starvation had not set in.

The presence of methane in Examples II and III indicates clearly that while in Example I alcohol was produced as a final product, in Examples II and III acetic acid was produced in large amounts, but little or no alcohol.

For the purpose of maintaining the hydrogen ion concentration of the mash within the limits between about $10^{-9}$ and $10^{-5}$, preferably $10^{-7}$, in place of sodium carbonate, sodium bicarbonate or ammonium carbonate as described above potassium carbonate or bicarbonate may be employed or sodium, ammonium or potassium hydroxides substituted, chemically equivalent amounts being used.

In fermentation processes of the kind indicated I prefer to employ a concentration of cellulose matter of not less than about 5 per cent and so to arrange the conditions of fermentation that the time in which good yields are obtained is about five to seven days.

In connection with inoculation most naturally-occurring cellulosic materials have a suitable bacterial flora already present on them and it is not essential to inoculate such materials unless in their preparation they have been subjected to a process which sterilizes them.

If desired mixtures of green cellulosic materials and dried cellulosic materials may be employed, for example green bamboo or fresh grass and sulphite pulp or dry corn cobs, the proportion between the two classes of materials, for instance, being such that the combined mass can be directly fermented without further inoculation.

Having now described my invention what I claim as new and desire to secure by Letters Patent is:—

1. A process for the fermentation of cellulosic materials according to which the hydrogen ion concentration is maintained within the limits about $10^{-9}$ and $10^{-5}$, measured in the bulk of the mash, by the employment of a compound of an alkali metal (including ammonium) after the addition of a compound of an element of which the phosphate is substantially insoluble in water.

2. A process for the fermentation of cellulosic materials according to which the hydrogen ion concentration is maintained within the limits about $10^{-9}$ and $10^{-5}$, measured in the bulk of the mash, by the employment of a compound of an alkali metal (including ammonium) after the addition of a compound of an alkaline earth metal salt (including a salt of magnesium).

3. A process as claimed in claim 2 in which the alkaline earth metal compound is a salt of calcium.

4. A process as claimed in claim 2 in which the alkaline earth metal compound is calcium carbonate.

In testimony whereof I have signed my name to this specification.

HERBERT LANGWELL.